United States Patent
Bradway et al.

(10) Patent No.: US 9,925,726 B1
(45) Date of Patent: Mar. 27, 2018

(54) APPARATUS FOR HOLDING THREE-DIMENSIONAL (3-D) OBJECTS DURING PRINTING THEREON

(71) Applicant: XEROX CORPORATION, Norwalk, CT (US)

(72) Inventors: Jeffrey J Bradway, Rochester, NY (US); Linn C Hoover, Webster, NY (US); Erwin Ruiz, Rochester, NY (US); Paul M Fromm, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/477,127

(22) Filed: Apr. 3, 2017

(51) Int. Cl.
*B41J 3/407* (2006.01)
*B41F 17/00* (2006.01)
*B41F 17/38* (2006.01)
*B29C 67/00* (2017.01)
*B65H 29/00* (2006.01)
*B65H 3/08* (2006.01)

(52) U.S. Cl.
CPC ...... *B29C 67/0096* (2013.01); *B29C 67/0085* (2013.01); *B29C 67/0092* (2013.01); *B65H 3/0808* (2013.01); *B65H 3/0883* (2013.01); *B65H 29/003* (2013.01)

(58) Field of Classification Search
CPC ..... A41D 2500/10; B41F 15/18; B41F 16/02; B41F 17/00; B41F 17/003; B41F 17/005; B41F 17/38; B41J 3/407; B41J 3/4078; B41P 2217/60; B29C 67/00; B29C 67/0085; B29C 67/0092; B29C 67/0096; B65H 3/0808; B65H 3/0883; B65H 29/003; D04B 1/24; D06H 1/02
See application file for complete search history.

(56) References Cited

U.S. PATENT DOCUMENTS

| 9,120,300 B2 * | 9/2015 | Moehringer | B41J 2/14 |
| 9,297,097 B2 * | 3/2016 | Turner | B41F 15/18 |
| 2010/0186610 A1 * | 7/2010 | Polk | B41J 3/407 101/35 |
| 2017/0341414 A1 * | 11/2017 | Buchar | B41J 3/4073 |

FOREIGN PATENT DOCUMENTS

| GB | 2291011 A * | 1/1996 | B41F 17/005 |
| WO | WO 2015052240 A1 * | 4/2015 | B41J 3/4073 |

OTHER PUBLICATIONS

U.S. Appl. No. 15/163,880, filed May 25, 2016, and entitled System for Printing on Three Dimensional (3D) Objects by Wayne A. Buchar et al.

* cited by examiner

Primary Examiner — Nguyen Ha

(57) ABSTRACT

A universal object holding mechanism for holding three-dimensional objects for printing thereon uses an array of wires connected to one side of a frame that are stretched to an opposite side of the frame of the holding mechanism to thereby trap an object between the wires and a back plate positioned behind and spaced from the frame. A minimum number of wires are used to hold the object against a minimum number of datum pins, so that the maximum amount of object surface is available for printing.

20 Claims, 5 Drawing Sheets

APPARATUS FOR HOLDING THREE-DIMENSIONAL (3-D) OBJECTS DURING PRINTING THEREON

CROSS REFERENCE TO RELATED APPLICATIONS

Cross-referenced is commonly assigned U.S. application Ser. No. 13/477,125 filed Apr. 3, 2017, and VACUUM TUBE OBJECT CLAMPING ARRAY WITH CONFORMABLE PADS by Timothy P. Foley et al; U.S. application Ser. No. 13/477,126, filed Apr. 3, 2017, and entitled UNIVERSAL PART GRIPPER WITH CONFORMABLE TUBE GRIPPERS by Linn C. Hoover et al; U.S. application Ser. No. 13/477,427, filed Apr. 3, 2017, and entitled SPRING LOADED SUCTION CUP ARRAY GRIPPER by Paul M. Fromm et al; U.S. Application Ser. No. 62/480,563, filed Apr. 3, 2017 and entitled UNIVERSAL OBJECT HOLDER FOR 3-D PRINTING USING A CONFORMABLE GRIPPER BALL by Erwin Ruiz et al; U.S. application Ser. No. 13/477,439, filed Apr. 3, 2017, and entitled UNIVERSAL PART GRIPPER USING 3-D PRINTED MOUNTING PLATE by Linn C. Hoover et al; U.S. application Ser. No. 13/477,454, filed Apr. 3, 2017, and entitled APPARATUS FOR GENERAL OBJECT HOLDING DURING PRINTING USING MULTIPLE CONFORMABLE BALLS by Jeffrey J. Bradway et al; U.S. application Ser. No. 13/477,464, filed Apr. 3, 2017, and entitled AIR PRESSURE LOADED MEMBRANE AND PIN ARRAY GRIPPER by Paul M. Fromm et al; U.S. application Ser. No. 13/477,488, filed Apr. 3, 2017, and entitled APPARATUS FOR REPEATABLE STAGING AND HOLDING OBJECTS IN A DIRECT TO OBJECT PRINTER USING AN ARRAY OF PINS by Jeffrey J. Bradway et al; and U.S. application Ser. No. 13/477,488, filed Apr. 3, 2017, and entitled SPRING LOADED IRIS MECHANISM STACK GRIPPER by Paul M. Fromm et al; all of which are included in their entirety herein by reference.

TECHNICAL FIELD

This disclosure relates generally to a system for printing on three-dimensional (3-D) objects, and more particularly, to an apparatus adapted for general object holding in a non-production environment.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2-D) media printing technology, to apply image content onto three-dimensional objects would be difficult. Since the surfaces to be printed must be presented to the print heads as relatively flat, two-dimensional surfaces, the objects have to be maneuvered carefully to present portions of the articles as parallel planes to the print heads.

One printing system that accomplishes this is disclosed in copending and commonly assigned U.S. patent application Ser. No. 15/163,880, filed on May 25, 2016, and entitled SYSTEM FOR PRINTING ON THREE-DIMENSIONAL (3D) OBJECTS by Wayne A. Buchar et al. This printing system includes a plurality of print heads arranged in a 2-D array, each printhead being configured to eject marking material, a support member positioned to be parallel to a plane formed by 2-D array of print heads, a member movably mounted to the support member, an actuator operatively connected to the movably mounted member to enable the actuator to move the moveably mounted member along the support member, an object holder configured to mount to the movably mounted member to enable the object holder to pass the array of print heads as the moveably mounted member moves along the support member, and a controller operatively connected to the plurality of print heads and the actuator, the controller being configured to operate the actuator to move the object holder past the array of print heads and to operate the plurality of print heads to eject marking material onto objects held by the object holder as the object holder passes the array of print heads. This application is included herein by reference for the practice of the present disclosure in its entirety.

A problem with this approach is that it requires a unique part holder for each part that is to be printed. The part holders are currently machined metal brackets with dedicated locating and fastening features machined into each holder. This limits the ability of an operator to print onto general objects brought by an end user.

SUMMARY

In answer to this shortcoming, disclosed is a generalized holding mechanism that uses an array of wires that can be stretched from one side of the holder to the other. The device being held is trapped between the wires and a back plate of the holding mechanism. A minimum number of wires is used to hold the objects against a minimum number of datum pins, so that a maximum amount of surface of the device is available for printing.

BRIEF DESCRIPTION OF THE DRAWINGS

The foregoing aspects and other features of a printing system that prints images on 3-D objects are explained in the following description, taken in connection with the accompanying drawings.

DETAILED DESCRIPTION

Figure 1:
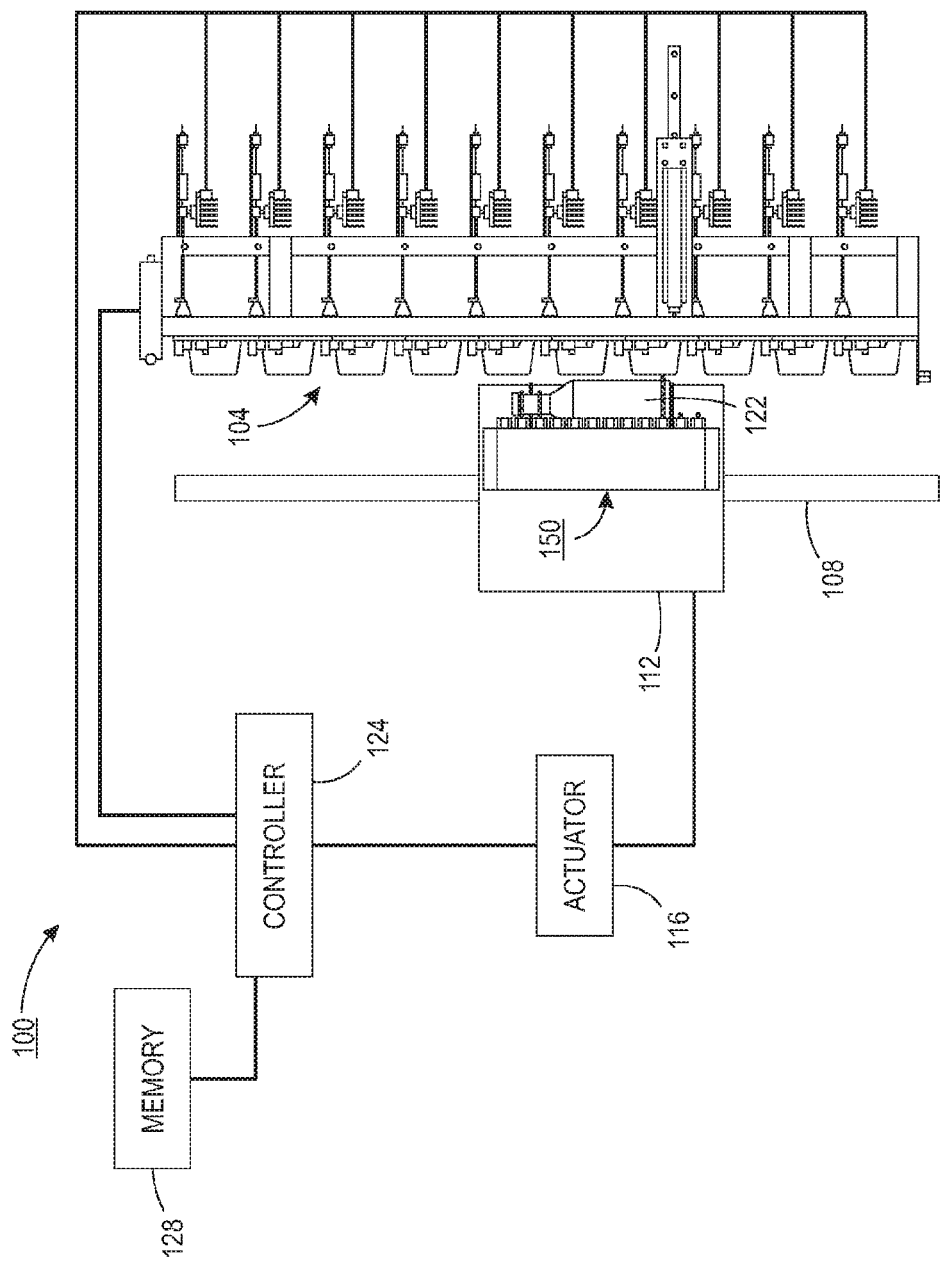
FIG. 1 illustrates an exemplary printing system 100 configured to print on a 3-D object.

For a general understanding of the present embodiments, reference is made to the drawings. In the drawings, like reference numerals have been used throughout to designate like elements.

FIG. 1 illustrates an exemplary printing system 100 configured to print on a 3-D object. The printing system 100 includes an array of print heads 104, a support member 108, a member 112 movably mounted to the support member 108, an actuator 116 operatively connected to the movably mounted member 112, a universal object holder 150 configured to mount to the movably mounted member 112, and a controller 124 operatively connected to the plurality of print heads and the actuator. As shown in FIG. 1, the array of print heads 104 is arranged in a two-dimensional array, which in the figure is a 10×1 array, although other array configurations can be used. Each printhead is fluidly connected to a supply of marking material (not shown) and is configured to eject marking material received from the supply. Some of the print heads can be connected to the same supply or each printhead can be connected to its own supply so each printhead can eject a different marking material.

The support member 108 is positioned to be parallel to a plane formed by the array of printheads and, as shown in the figure, is oriented so one end of the support member 108 is at a higher gravitational potential than the other end of the support member. This orientation enables the printing system 100 to have a smaller footprint than an alternative embodiment that horizontally orients the array of print heads and configures the support member, movably mounted member, and object holder to enable the object holder to pass objects past the horizontally arranged print heads so the print heads can eject marking material downwardly on the objects.

The member 112 is movably mounted to the support member 108 to enable the member to slide along the support member. In some embodiments, the member 112 can move bi-directionally along the support member. In other embodiments, the support member 108 is configured to provide a return path to the lower end of the support member to form a track for the movably mounted member. The actuator 116 is operatively connected to the movably mounted member 112 so the actuator 116 can move the moveably mounted member 112 along the support member 108 and enable the object holder 150 connected to the moveably mounted member 112 to pass the array of print heads 104 in one dimension of the two-dimensional array of print heads. In the embodiment depicted in the figure, the universal object holder 150 moves an object 122 along the length dimension of the array of print heads 104 by conventional means, such as, with the use of pulleys and belts or screw drive.

The controller 124 is configured with programmed instructions stored in a memory 128 operatively connected to the controller so the controller can execute the programmed instructions to operate components in the printing system 100. Thus, the controller 124 is configured to operate the actuator 116 to move the object holder 150 past the array of print heads 104 and to operate the array of print heads 104 to eject marking material onto objects held by the object holder 150 as the object holder passes the array of print heads 104.

Figure 2:
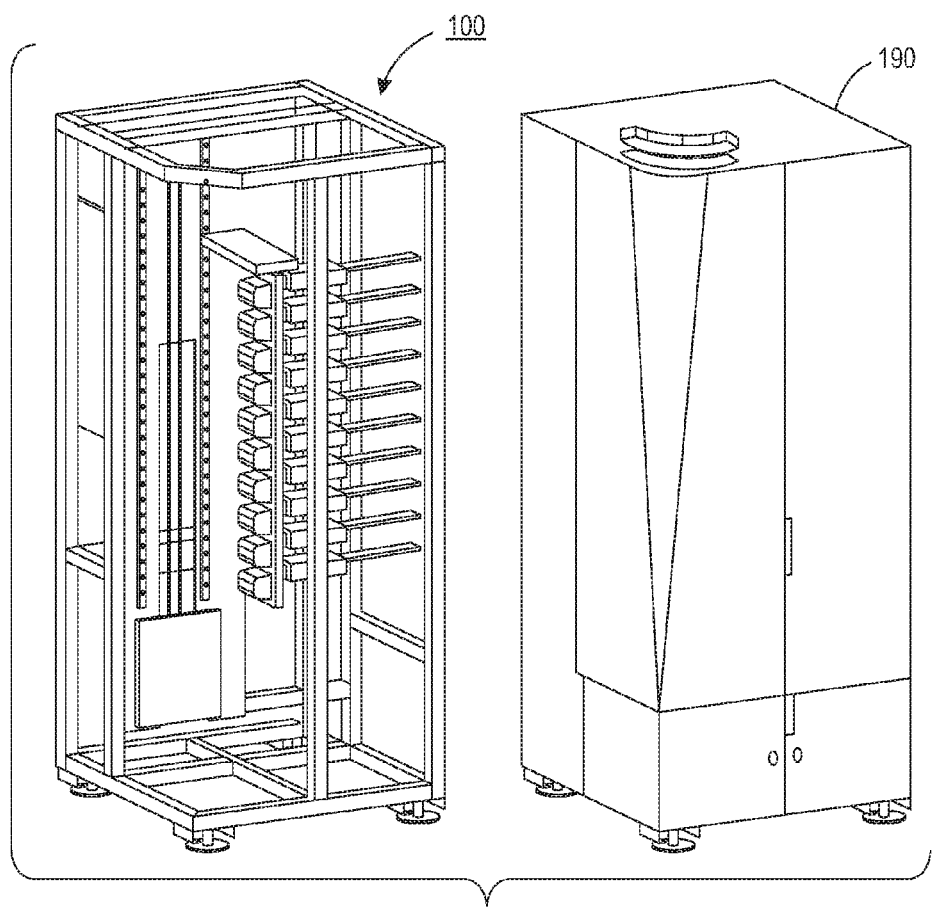
FIG. 2 depicts a cabinet within which the exemplary printing system 100 shown in FIG. 1 can be installed.

The system configuration shown in FIG. 1 is especially advantageous in a number of aspects. For one, as noted above, the vertical configuration of the array of print heads 104 and the support member 108 enables the system 100 to have a smaller footprint than a system configured with a horizontal orientation of the array and support member. This smaller footprint of the system enables the system 100 to be housed in a single cabinet 190, as depicted in FIG. 2, and installed in non-production outlets. Once installed, a universal or general object holder, as described further below, can be used with the system to print a variety of goods that are generic in appearance until printed. Another advantageous aspect of the system 100 shown in FIG. 1 is the gap presented between the objects carried by the object holder 150 and the print heads of the array of print heads 104. The gap in this embodiment is in a range of about five to about six mm. Heretofore, the gap was maintained in a range centered about 1 mm. A smaller gap was thought to ensure a more accurate placement of drops from an ejecting printhead. However, Applicants have discovered that a greater gap width reduces the effect of laminar airflow in the gap between the print heads and the surface receiving the marking material drops so the accuracy of drop placement, especially for larger 3-D objects, is maintained. This effect is particularly effective with the larger drop sizes noted previously. Without the turbulence produced by the movement of an object in close proximity to a printhead, the momentum of the ejected drops is adequate to keep the drops on their projected course so the registration of the drops from different print heads can be preserved for maintaining image quality. Additionally, the controller 124 can be configured with programmed instructions to operate the actuator 116 to move the object holder at speeds that attenuate the air turbulence in the greater gap between the printhead and the object surface used in the system 100.

Figure 3A:
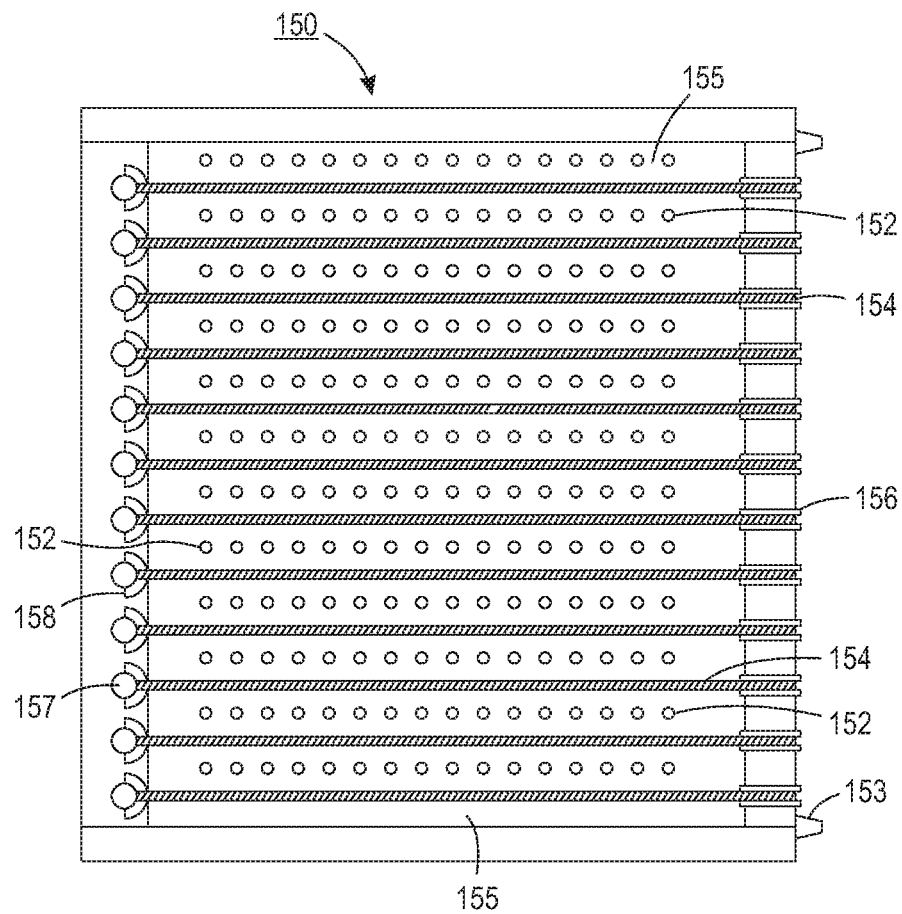
FIGS. 3A and 3B depict details of the universal object holder and the moveably mounted member shown in FIG. 1 in accordance with the present disclosure.
Figure 3B:
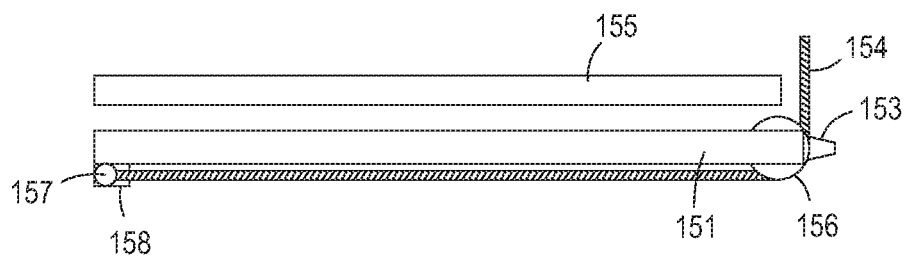

Turning now to the present disclosure, a generic or universal object loom holder 150 able to accommodate varied sized objects is shown in FIGS. 3A and 3B. The loom holder 150 in FIG. 3A includes a back plate 155 having apertures/holes 152 therein that are used in securing an object 122 in FIG. 1, to back plate 155 for printing thereon. Back plate 155 is positioned spaced from loom frame 151 as shown in FIG. 3B to give depth between the two members for the placement of varied sized objects. Docking pins 153 are attached to loom frame 151 and configured for selectively mounting the object holder 150 to the movably mounted member 112. An array of adaptable wires 154 having beads 157 on one end are mounted on one side of loom frame 151 around pulleys 156 and adapted to be drawn across loom frame 151 and inserted into bead holders 158 on the opposite side of loom frame 151 in order to hold an object to back plate 155. A user can quickly pull the beads from the holder to disengage the wires when the wire tension has been removed.

Figure 4:
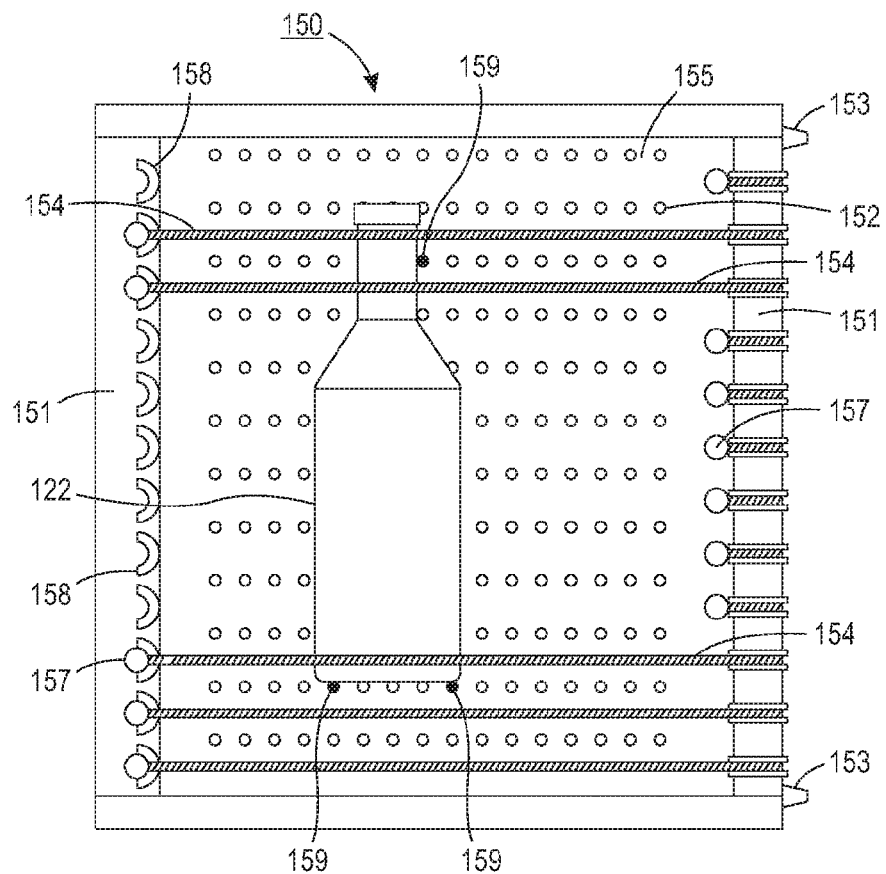
FIG. 4 shows the universal object holder shown in FIG. 3A holding different types an object.
Figure 5:
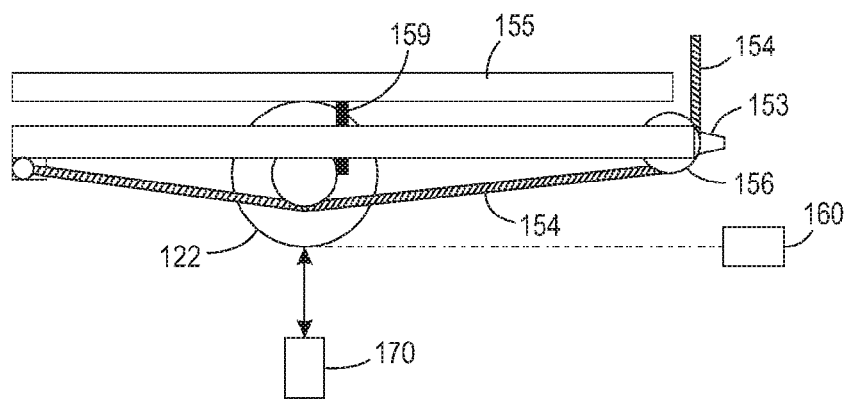
FIG. 5 is a plan view of the universal holder shown in FIG. 3A.

An object 122 is shown being held in FIG. 4. Object 122 is resting against three datum pins 159. Datum pins 159 are placed into an array of holes 152 in back plate 155. Some of the wires 154 that would interfere with placing print onto object 122 are disengaged from the bead holders 158 and retracted. With reference to FIG. 5, when the object is held, a print head gap between print heads 104 and object 122 is checked by either distance probe 170 or light curtain 160 and then adjusted as needed by a conventional Z-axis motor (not shown).

Figure 6A:
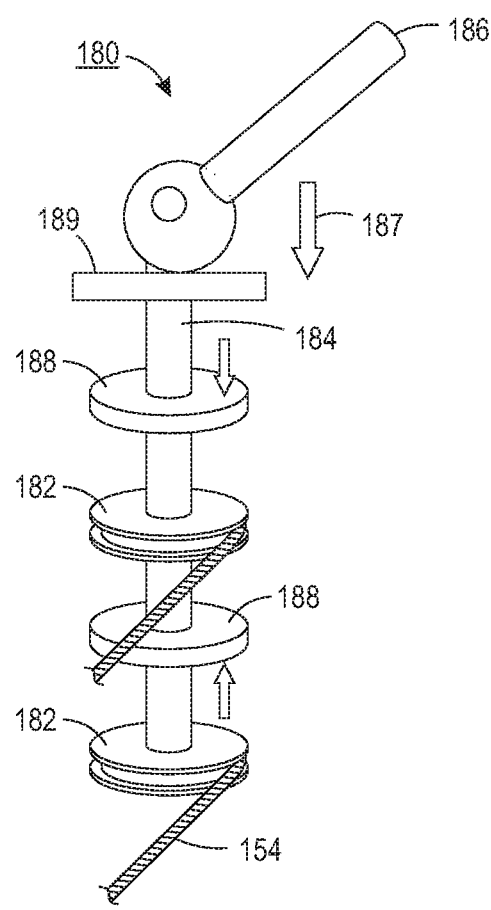
FIGS. 6A and 6B depict a slipper clutch tensioning system used with the universal object holder of FIG. 4.
Figure 6B:
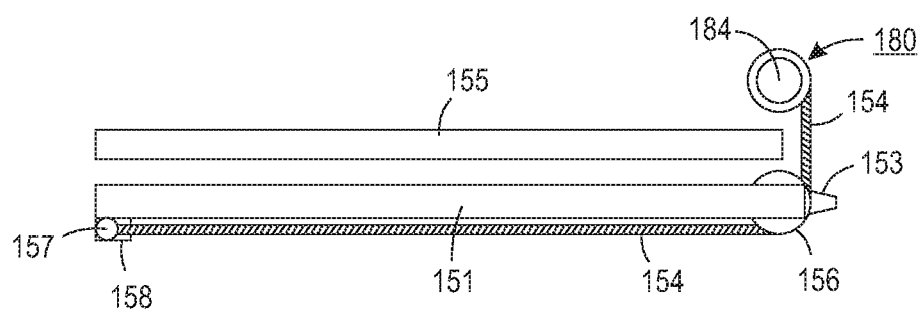

An object holder tensioning system 180 is shown in FIGS. 6A and 6B that includes wire spools and slipper clutches 182 connected to a central rotating shaft 184. To apply tension, shaft 184 is rotated counterclockwise as shown in FIG. 6B by either a motor or an operator rotating locking lever 186. The locking lever 186 is now engaged to hold all rotating elements fixed in place. This ensures consistent tension on all wires 154 and holds the object. All intermediate rotating elements/spools on central shaft 184 are allowed to move in the axial direction and brought into tight contact. Clamp pads 188 ensure sufficient friction between the spools and top and bottom bracketry 189 to prevent further rotation.

In recapitulation, holding a variety of 3-D object sizes for printing thereon is accomplished with an array of spool-mounted wires that are connected to a frame and stretched over each object and tensioned. The object is pressed against a movable back plate within the frame by tension on the wires and is aligned to the movable back plate by datum pins. Wires not actively used to hold the object against the back plate may be unclipped from the frame and allowed to retract around the spools. When the object is positioned and fully tensioned, the spools can be locked in place using an over-center locking lever.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printing system, comprising:
   a plurality of printheads arranged in a two-dimensional array, each printhead being configured to eject marking material;
   a support member positioned to be parallel to a plane formed by the two-dimensional array of printheads;
   a member movably mounted to the support member;
   an actuator operatively connected to the movably mounted member to enable the actuator to move the moveably mounted member along the support member;
   an object holder configured to mount to the movably mounted member to enable the object holder to pass the array of printheads as the moveably mounted member moves along the support member;
   a controller operatively connected to the plurality of printheads and the actuator, the controller being configured to operate the actuator to move the object holder past the array of printheads and to operate the plurality of printheads to eject marking material onto objects held by the object holder as the object holder passes the array of printheads; and
   wherein said object holder includes a frame with an array of wires attached thereto that are adapted to be stretched from one side of said frame to an opposite side of said frame.

2. The printing system of claim 1, including a back plate positioned spaced from frame.

3. The printing system of claim 2, wherein said back plate includes a series of apertures therein.

4. The printing system of claim 3, wherein said object holder includes a plurality of datum pins adapted to be inserted into said apertures within said back plate depending on the shape of objects to be held.

5. The printing system of claim 4, wherein said wires include beads on outer ends thereof and are supported on pulleys positioned within said frame.

6. The printing system of claim 5, wherein said frame includes bead holders attached thereto.

7. The printing system of claim 6, wherein said frame includes docking pins for attachment to said movably mounted member.

8. The printing system of claim 1, the object holder further comprising:
   a tensioning system for tensioning said array of wires, said tensioning system including a vertically positioned shaft with a series of spool and slipper clutch devices mounted thereon with each slipper clutch and spool device being separated by clamp pads.

9. The printing system of claim 8, wherein said tensioning system includes a locking mechanism attached to said vertically positioned shaft and adapted to move said clamp pads into and out of contact with said series of spool and slipper clutch devices.

10. The printing system of claim 9, wherein said locking mechanism is an over-center locking lever.

11. A printer, said printer including an apparatus for holding three-dimensional objects for printing thereon, comprising:
    an array of printheads, each printhead being configured to eject marking material;
    a support member positioned to be parallel to a plane formed by said array of printheads; and
    an object holder configured for movably mounting to said support member to enable said object holder to pass said array of printheads as said object holder is moved along said support member, said object holder including an array of wires adapted to be drawn from one side of said holder to an opposite side of said holder.

12. The printer of claim 11, wherein said holder includes a back plate, and wherein an object to be printed upon is held against said back plate by selected ones of said array of wires.

13. The printer of claim 12, wherein said object to be printed upon is aligned to said back plate by a plurality of datum pins.

14. The printer of claim 13, wherein said back plate includes a series of apertures and said plurality of datum pins are adapted for insertion into selected ones of said series of apertures.

15. The printer of claim 14, wherein ends of said array of wires include beads.

16. The printer of claim 14, the object holder further comprising:
    spools onto which each of said array of wires is wound, and wherein each of said spools is connected to a slipper clutch and a central rotating shaft.

17. The printer of claim 16, the object holder further comprising:
    a mechanism adapted to rotate said central shaft until all of said slipper clutches start to slip and thereby ensure consistent tension on all of said array of wires that holds said object to be printed upon.

18. The printer of claim 17, including clamp pads mounted upon said central shaft and positioned to apply friction to said spools when said mechanism rotates said central shaft.

19. The printer of claim 18, wherein said mechanism adapted to rotate said central shaft is a locking lever.

20. The printer of claim 18, wherein said spools and said clamp pads are adapted to move in an axial direction with respect to said central shaft thereby causing said slipper clutches to be locked and tension to be held.

* * * * *